Patented Dec. 8, 1931 1,835,055

UNITED STATES PATENT OFFICE

RUSSELL L. JENKINS, OF ANNISTON, ALABAMA, AND JAMES F. NORRIS, OF CAMBRIDGE, MASSACHUSETTS, ASSIGNORS TO SWANN RESEARCH, INC., A CORPORATION OF ALABAMA

POROUS SILICA CATALYST AND METHOD OF PREPARING SAME FROM CHRYSOCOLLA

No Drawing. Application filed October 22, 1928. Serial No. 314,317.

Our invention relates to catalysts, more particularly to porous silica catalysts and has for its object the provision of a catalyst of the character designated, together with an improved method of preparing the same.

A further object of our invention is to provide an improved silica skeleton catalyst formed from chrysocolla, together with an improved method of forming the same.

It is known that the commercial variety of silica gel is an active catalyst in certain catalytic processes. It is also known that in order to enhance the catalytic activity of ordinary silica gel, or in order to lend special catalytic properties to it, silica gel has been impregnated during manufacture, as by mixing either catalytic materials or materials which may readily be converted to catalytic materials with the silica sol prior to the setting of the sol to a gel. (For example, see U. S. patents to Patrick, Nos. 1,577,186, and 1,577,187.) Variations of this procedure have been employed which consist essentially in introducing the catalytic material at different stages of the process of manufacture of the silica gel. These methods cover the use of silica gel, plus a catalytic material, the silica gel providing a very large surface for the catalytic material to be deposited on.

We have found by experiment that porous silica skeletons may be prepared as shown below so as to retain small quantities of substances and when so prepared have valuable catalytic properties. The weight of catalytic materials residual in the silica skeletons as prepared during manufacture is relatively small compared to the total weight of the skeletons. The purpose for which these silica skeletons are useful depends largely on the materials residual in the skeleton.

Silica skeletons are distinctly different from silica gels, both in the ease of manufacture and in certain properties during manufacture, and as a finished product. For example, in the manufacture of silica skeletons certain insoluble silicates are treated with mineral acids until the silicate has completely or nearly completely reacted with said acids to give a metallic salt or salts and a residue of silica which we prefer to designate as a porous silica skeleton. These porous silica skeletons are of approximately the same size and shape as the original pieces of silicate, and have a relatively firm or rigid structure as compared with that of a silica gel just after setting. The silica skeleton so produced is then washed with water to remove soluble salts, and is dried. After washing and prior to drying, the skeleton contains a weight of water roughly equal to its weight when dried, instead of several times that weight as is the case with silica gel after washing and prior to drying. Furthermore, during drying, a silica skeleton undergoes very little if any change in volume whereas on drying, silica gel, which has been allowed to set and then been washed, the volume of the soft wet gel is many times that of the finished dried product.

As a preferred method of carrying out our invention, we proceed as follows:

Chrysocolla, a mineral of the general composition, $CuSiO_3 \cdot 2H_2O$ is crushed to the desired size, and is placed on perforated trays which are then suspended just below the surface of a vessel containing a 6 normal solution of hydrochloric acid, either hot or cold. The mineral is rapidly attacked. The copper chloride solution formed has a higher specific gravity than the acid which causes a circulation of fresh acid through the bed of mineral. After the copper has been leached from the mineral it is then washed free from the major part of the soluble copper salts and dried at 100° to 110° C.

The porous silica skeleton if not treated too long during the process of manufacture retains sufficient metallic salts, presumably chiefly copper, to render it a valuable catalyst especially in the hydrolysis of monochlorobenzene with steam in the vapor phase. As an example of this use of the catalyst and of the necessity for not too vigorous leaching, the following is given:

One sample of chrysocolla was leached with dilute hydrochloric acid washed and dried as indicated in the above example. Another was similarly treated but before washing was treated with concentrated acid. It was then thoroughly washed and dried. When a mixture of monochlorobenzene and steam was passed through the first sample of catalyst contained in a suitable chamber and heated to approximately 575° C. 8% of the chlorobenzene was converted to phenol; when the same reaction mixture was passed through the second sample under identical conditions only 1.1% of the chlorobenzene was converted to phenol. Other experiments have shown that by varying the treatment of the chrysocolla as to length of time and concentration of acid used, the activity of the catalyst may be varied considerably. It is quite obvious that it is impossible to definitely fix the limits of the residual copper content which will vary with the nature of the reaction which it is sought to catalyze.

While we have described one way of carrying out our invention, it will be obvious to those skilled in the art that it is not so limited but is susceptible of various changes and modifications without departing from the spirit thereof, and we desire therefore that only such limitations shall be placed thereupon as are imposed by the prior art or as are specifically set forth in the appended claims.

What we claim is:

1. The method of forming a silica skeleton catalyst from chrysocolla which comprises submerging a bed of chrysocolla just below the surface of a body of hydrochloric acid, and removing the chrysocolla from the acid when only a small proportion of the copper content thereof remains therein.

2. The method of forming a silica skeleton catalyst from chrysocolla which comprises leaching the chrysocolla with mineral acid until only a small portion of the original copper content remains therein.

3. The method of forming a silica skeleton catalyst from chrysocolla which comprises leaching the chrysocolla with hydrochloric acid until only a small portion of the original copper content remains therein.

In testimony whereof we affix our signatures.

RUSSELL L. JENKINS.
JAMES F. NORRIS.